US005762980A

United States Patent [19]

Bielfeldt

[11] Patent Number: 5,762,980

[45] Date of Patent: Jun. 9, 1998

[54] INSTALLATION FOR THE CONTINUOUS PRODUCTION OF BOARDS OF WOOD-BASED MATERIAL

[75] Inventor: Friedrich B. Bielfeldt, Pähl, Germany

[73] Assignee: Maschinenfabrik J. Dieffenbacher GmbH & Co., Eppingen, Germany

[21] Appl. No.: 790,852

[22] Filed: Feb. 3, 1997

Related U.S. Application Data

[62] Division of Ser. No. 560,095, Nov. 17, 1995.

[30] Foreign Application Priority Data

Nov. 17, 1994 [DE] Germany ............................ 4441017.4

[51] Int. Cl.[6] ............................ B29C 43/22; B30B 5/06

[52] U.S. Cl. ............................ 425/371

[58] Field of Search ............................ 425/371, 329

[56] References Cited

U.S. PATENT DOCUMENTS 3,230,287 1/1966 Caron et al. ............ 264/120
4,216,179 8/1980 Lamberts et al. ............ 425/371
4,410,474 10/1983 Ahrweiler ............ 425/371
4,895,508 1/1990 Held ............ 425/371
5,063,010 11/1991 Fischer et al. ............ 425/371

FOREIGN PATENT DOCUMENTS 2 058 820 5/1972 Germany .
24 25 638 12/1975 Germany .
39 14 106 10/1990 Germany .

*Primary Examiner*—Mary Lynn Theisen
*Attorney, Agent, or Firm*—Foley & Lardner

[57] ABSTRACT

A process and installation for the continuous production of boards of wood-based material, includes the steps of forming on a continuously moving scattering belt, a pressed material mat includes an initial mixture of chips and/or fibers from a scattering station and mixed with binder; precompacting and preheating the pressed material mat between the scattering station and a main pressing region; and bringing into an end form and curing the pressed material with the application of pressure and heat in a main pressing regions. The moisture level of the pressed material mat is less on entry into the main pressing region than the moisture level of the initial mixture in the scattering of the pressed material mat, part of the moisture imparted to it in the scattering being extracted again by hot-air preheating.

12 Claims, 2 Drawing Sheets

INSTALLATION FOR THE CONTINUOUS PRODUCTION OF BOARDS OF WOOD-BASED MATERIAL

This application is a divisional, of application Ser. No. 08/560,095, filed Nov. 17, 1995.

BACKGROUND OF THE INVENTION

The invention relates to a process for the continuous production of boards of wood-based material, primarily chipboards/fiberboards. The invention further relates to a system for carrying out the process according to the invention.

A process is known from DE-B-24 25 638. According to the latter, the intention is to increase the output of finished boards, in particular in the production of chipboards or fiberboards, by a continuously operating press or to reduce the length of the continuously operating press. For this purpose, after a preliminary pressing operation, the pressed material mat is preheated. It has been found to be a disadvantage of this that, after leaving the continuously operating main press, the finished boards still have troublesome steam occlusions, which can be prevented only by expensive and complicated steam removal measures within the pressing zone of the continuously operating main press.

The use of hot gases, primarily highly pressurized steam, in the continuously operating presses is disclosed by DE-A-20 58 820. The superheated steam is fed to the pressed material through the gas-permeable belts (meshed metal belts, or steel belts perforated in the manner of a screen). These gas-permeable steel belts are supported by means of rolling supporting elements, which in turn are supported against a rolling surface. In principle, the feeding of the hot gas takes place within the main press, the feeding of the gas along the pressing zone taking place in terms of rate and temperature within the curing and calibrating zone, that is to say in the high-compaction region of the continuously operating main press. The disadvantage of this apparatus for carrying out the process is that, due to the rolling supporting elements, the superheated steam flows through a relatively long steam-depressurization zone in an uncontrolled manner, and consequently cools to varying degrees. Secondly, the gas-permeable steel belt structure on the surfaces of the chipboards or fiberboards produced gives rise to a marked surface texture, which has to be subsequently ground off, additional production costs arising due to material losses.

A further configuration of the preheating of the pressed material mats by a steam jet is represented by the apparatus published in German Patent 39 14 106, with the advantage that, at least in the main press, nonperforated, smooth steel belts are used, so that no surface markings occur on the finished pressed boards. A novel feature of this patent is the rule for proportioning the residual moisture of the pressed material mat after leaving the steam treatment zone before entry into the pressing nip of the continuously operating main press. This residual moisture, that is the controlled moisture, of preferably 12 percent by weight is set from a pressed material mat whose initial moisture is less than this known controlled moisture, because the water content of the pressed material mat is raised again by the feeding of steam, it being intended for the pressed material mat to be raised in temperature by about 60° Celsius, that is to say to a maximum of 80° C. It has been found to be a disadvantage that the water content of the pressed material mat, increased by the feeding of steam, has to be extracted again, that is to say, contrary to the aim stated as the object, a not inconsiderable part of the pressing zone of the main press is again required for evaporating the moisture introduced, because the finished pressed board is intended, according to practice thus far in technological applications, to leave the continuously operating main press with a residual moisture of about six percent by weight. On account of the increased temperature of the pressed material mat up to 80° Celsius, the controlled moisture of on average 12 percent by weight is no longer required in the full amount as a "means of heat conduction". Furthermore, due to the high entry temperature of about 80° Celsius and the high controlled moisture of about 12.5 percent by weight, the pressed material mat becomes so highly plastic that a higher compaction in the outer layer regions of the boards is possible only to a limited extent. This disadvantage also applies in the same way to the industrial property rights already mentioned above and to the processes described above. Due to the inadequate compaction of the outer layer regions, the usefulness of the boards thus produced is also considerably impaired. That it to say that the boards not only have a lower bending resistance but also an inadequate surface hardness and, as a result, are much less suitable for painting and/or laminating.

The present invention is based on the object of further developing the process of continuously producing boards of wood-based material, primarily chipboards/ fiberboards, such that a preheating and precompaction of the pressed material mat is made possible without additional steam-removal measures being required within the main pressing region, it being intended for the preheating temperature to bring about shorter setting and crosslinking times within the continuously operating main press and leading as a result to a marked increase in production with shorter pressing times and also achieving a higher compaction of the outer layer regions in comparison with the middle core region in the finished pressed board. The invention is also based on the object of providing an installation which is particularly suitable for carrying out the developed process.

Also to be mentioned as an advantage of the present invention is that, up until entry into the main pressing region, or up until entry into the run-in nip of the continuously operating press, the pressed material mat is regulated during preheating to a temperature just a little below the initial polymerization of the binder and the moisture level is regulated below the controlled moisture, the initial polymerization temperature generally lying between 60° Celsius and 100° Celsius steam point, depending on the reaction time of the binder.

SUMMARY OF THE INVENTION

The invention provides a process for the continuous production of boards of wood-based material, comprising the steps of forming, on a continuously moving scattering belt, a pressed material mat comprising an initial mixture of chips and/or fibers from a scattering station and mixed with binder, precompacting and preheating the pressed material between the scattering station and a main pressing region bringing into an end form and curing the pressed material mat with application of pressure and heat in the main pressing region; wherein a moisture level of the pressed material mat is less on entry into the main pressing region than the moisture level of the initial mixture in the scattering of the pressed material mat, part of the moisture imparted to it in the scattering being extracted again by hot-air preheating.

The process according to the invention particularly achieves the effect that, with the preliminary press with preheating and moisture conditioning, the pressed material mat is raised from the ambient temperature, equal to or greater than 20° Celsius, to a temperature level of 65° Celsius to 90° Celsius, preferably 80° C.—in any case a little below the initial polymerization point of the binder—with a set moistness of 6 to 12 percent by weight, preferably 9 percent by weight, with the advantage of a higher compaction of the outer layer region in comparison with the middle core region of the board in the apparent density ratio of about 1:0.5 to 1:0.66, and, in a manner corresponding to the difference between the maximum achievable preheating temperature in the preliminary press and the 100° Celsius steam point in the main press, the required heat transfer moisture is set as low as possible, in order that the steam removal zones along the continuously operating main press can be kept as short as possible with about 6 percent residual moisture of the finished board.

The installation for carrying out the process according to the invention comprises a scattering station, arranged above the gas-permeable scattering belt, for forming the pressed material mat, a precompaction press, downstream of which a hot-air heating and drying device is arranged as a preheating device, and a heatable continuously operating main press, wherein according to the invention the installation is constructed as a preliminary press with preheating and moisture-conditioning device which is enclosed in a continuous mode of operation by an upper and a lower gas-permeable screen belt, preferably meshed belt, and thereby forms a closed system, this system having three or four process sections, which comprise a precompaction press, a hot-air heating and drying device, and possibly a steam wetting device for the pressing faces of the pressed material mat, and a postcompaction press.

Preferred refinements and developments of the invention are set out below. Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DESCRIPTION OF THE DRAWINGS

The accompanying drawings, which are incorporated in and constitute a part of the specification, illustrate a presently preferred exemplary embodiment of the invention, and, together with the general description given above and the detailed description of the preferred embodiments given below, serve to explain the principles of the invention.

DETAILED DESCRIPTION OF THE PREFERRED EMBODIMENTS

Figure 1:
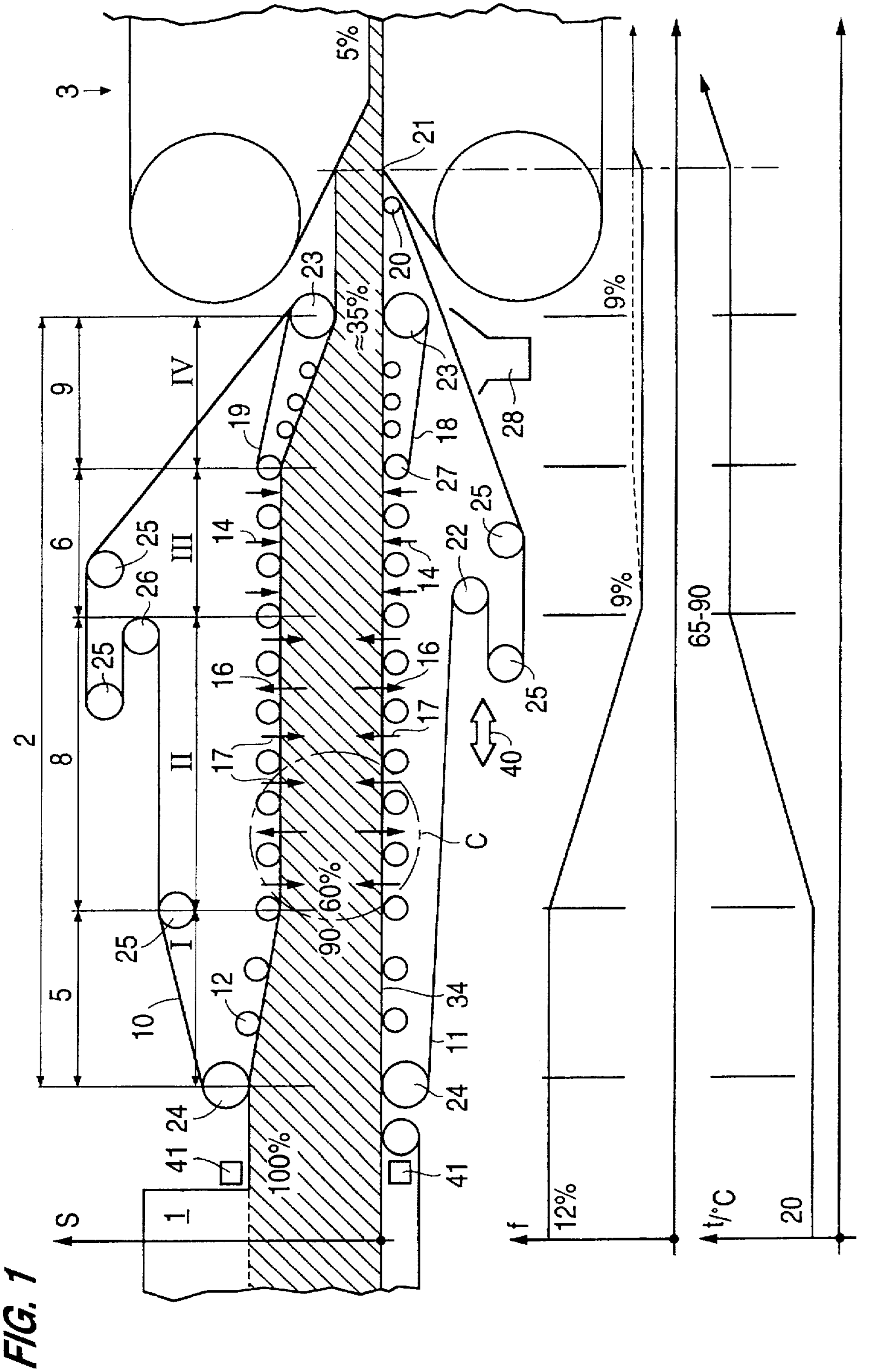
FIG. 1 shows in a diagrammatic representation the installation for carrying out the process according to the invention.

At the forefront of the teaching here of the process according to the invention is that the pressed material mat in the preliminary press must only be set to a moisture level below the controlled moisture in order to achieve the residual heat transfer in the main press up to 100° Celsius steam point of the binder for adequate curing of the pressed material mat in the main press, the evaporating out of water being reduced to a minimum extent of the pressing zone. This teaching is based on the technologically novel finding that, at a temperature reached by the pressed material mat of 85° to 90° Celsius, preferably 80° Celsius, on entry into the pressing nip of the main pressing zone, a moisture level of 6 to 12 percent by weight, preferably 9 percent by weight, is adequate to achieve complete curing in the continuously operating main press without having to provide an appreciable steam removal zone therein. As a result of the invention, the pressing zone of the continuously operating main press can be made shorter, since no excess moisture of several percent by weight has to be evaporated out, which has the consequence of a reduction in costs. Also, such a press can be installed in a smaller production hall.

Consequently, it is to be recorded as a novel technological finding from the invention that, at a pre-heating temperature of about 80° Celsius, the previously customary controlled moisture of up to 15 percent by weight is no longer required. This is because the controlled moisture of up to 15 percent by weight derived from conventional continuous press technology arises from the necessity that the presence of the cell moisture of the aqueous binder is required for the heat transfer from the outer layers to the middle of the pressed material mat. Since the kick-off temperature for curing and crosslinking of the board is generally at 100° Celsius, with a preheating temperature of 65° to 90° Celsius reached in the preliminary press with a preheating and moisture-conditioning device within the main pressing zone, the 100° Celsius limit is reached much earlier in the middle of the pressed material mat. That is to say the previously applicable teaching of operating with a controlled moisture of 15 percent by weight in the case of a preheating temperature of about 80° Celsius is not technologically advisable or necessary any longer after the finding from the process according to the invention.

For the uniform and accelerated heating through and moistening through of the pressed material mat according to the invention, it is decisive that the pressed material mat runs through the following process steps comprising measures in a preliminary press with preheating and moisture conditioning:

- the scattering of the pressed material mat is performed from an initial mixture with a moisture level as otherwise usual,
- after slight precompaction with adequate permeability, that is to say adequate freedom for the hot air to flow through the chips/fibers, the pressed material mat is heated to a specifically set temperature level, which bears relation to the polymerization temperature and reaction time of the binder, the increased moisture introduced into it being extracted, and
- even before entry into the main pressing region, the pressed material mat is brought to the otherwise usual degree of precompaction.

It may also be of advantage that the preheating and moisture conditioning is followed, even before the second precompaction, by moistening in a specifically set manner the surfaces of the pressed material mat in order to achieve a limited increase in the surface moisture by steam wetting over the surface area. As a result, the heat transfer from outside to inside is accelerated upon entry into the main press.

The previously customary controlled moisture for the outer layers of the pressed material mat upon entry into the continuously operating main press is 15 percent by weight and above. It has been found that, for the process according to the invention, the moistness of the outer layers brought down by about 2.5 to 6 percent by weight is adequate to ensure optimum outer layer compaction. Within the scope of the invention it is possible to operate with various variants with respect to compaction pressure, temperature and moisture setting within the three to four process zones of the preliminary press with preheating and moisture conditioning. In a preferred embodiment, the hot-air heating and drying zone is advantageously operated at a superatmospheric pressure, the temperature being increased continuously, as a function of the running-through speed, in a plurality of zones with increasing heating, while the moisture level of the pressed material mat is continuously decreased. For this purpose, the hot-air heating and drying device comprises a plurality of chambers.

Represented in the figures is the structural design of the installation for carrying out the process according to the invention, with scattering station 1, continuously operating preliminary press with preheating and moisture conditioning 2, and the continuously operating main press 3. The preliminary press with preheating and moisture-conditioning device 2 according to FIG. 1 is constructed as a self-contained modular unit and is arranged reversibly between the scattering station 1 and the likewise continuously operating main press 3, see reversing arrow 40. In the event of a fault or in the case of servicing, the entire unit can be moved in relation to the scattering station 1 with respect to the fixed roller 22, serving as a fixed point, and the pressed material still present in the preliminary press with preheating and moisture conditioning 2 is directed into a discharge bunker 28.

For detecting and reacting to metal parts in the pressed material mat 4, metal detectors 41 are provided. The modular unit of the preliminary press with preheating and moisture conditioning 2 comprises at the start the precompaction press 5, the hot-air heating and drying device 8, which if need be may be followed by a steam wetting device 6, and the postcompaction press 9, which are respectively enclosed above and below the pressed material mat 4, running through in the same sequence, by the circulating screen belts 10 and 11. The endless screen belts 10 and 11 are in this case driven by the driving drums 23 and at the entry are returned by the deflecting drums 24 via supporting rollers 25 and tensioning rollers 26. In contrast to the devices 5 and 8, the postcompaction press 9 has additional pressing belts 18 and 19, which are deflected by deflecting rollers 27, which are set.

The pressed material mat 4 is in this case supported from the entry (deflecting drums 24) to the exit (driving drums 23) by stationary pressure rollers 12, although the latter are arranged vertically adjustably in the upper press crossbeam (not shown), and the pressing angle of the individual units 5, 6, 8 and 9 can be set. The directional arrows 14, 16 and 17 indicate the direction of the hot-air streams in the hot-air heating and drying zone II, and also of the steam wetting zone III.

The time sequence of the process with regard to compaction s, the moisture regulation f and the raising of the temperature level t of the pressed material mat 4 can be seen over the transporting path. The process is based on a hybrid technology for a combined process sequence between hot-air heating and drying with a constant raising of the temperature level t in the low-pressure range between 0 and 3 bar superatmospheric pressure, in order to be able in principle to keep under control this continuously operating preliminary press system with regard to the feeding of hot gas and compaction of the rectangularly preformed pressed material mat 4 by simple structural means, with at the same time high availability and long service life.

The pressed material mat 4 is compacted from a scattered height s of 100% in the precompaction press 5 to about 95% to 60% of the height of the loose material and is fed to the hot-air heating and drying device 8; in the steam-jet wetting zone III, steam is fed onto the upper side and underside of the pressed material mat 4 over its surface area. In FIG. 1, the moistening of the outer layers is drawn in by dash-dotted lines. In the hot-air zone II, hot air can be fed in and carried away via the lateral bordering sides by corresponding lateral gas passages 37 in the telescopic panelings 29 of the two side borders.

Figure 2:
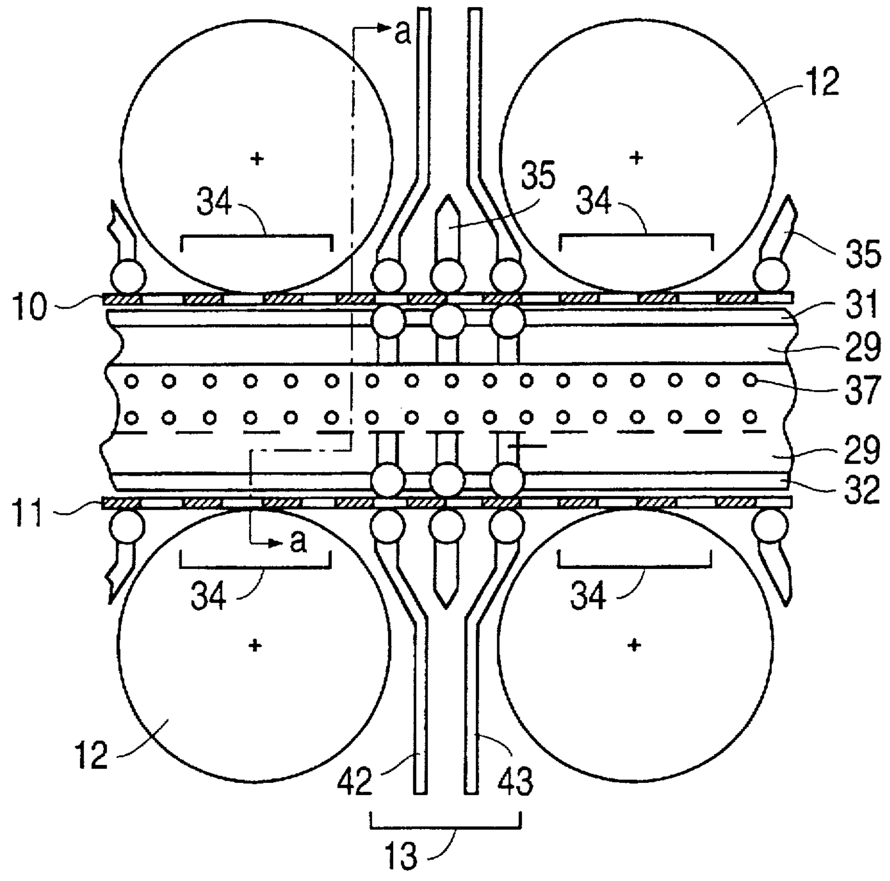
FIG. 2 shows a detail C from FIG. 1 on an enlarged scale.
Figure 3:
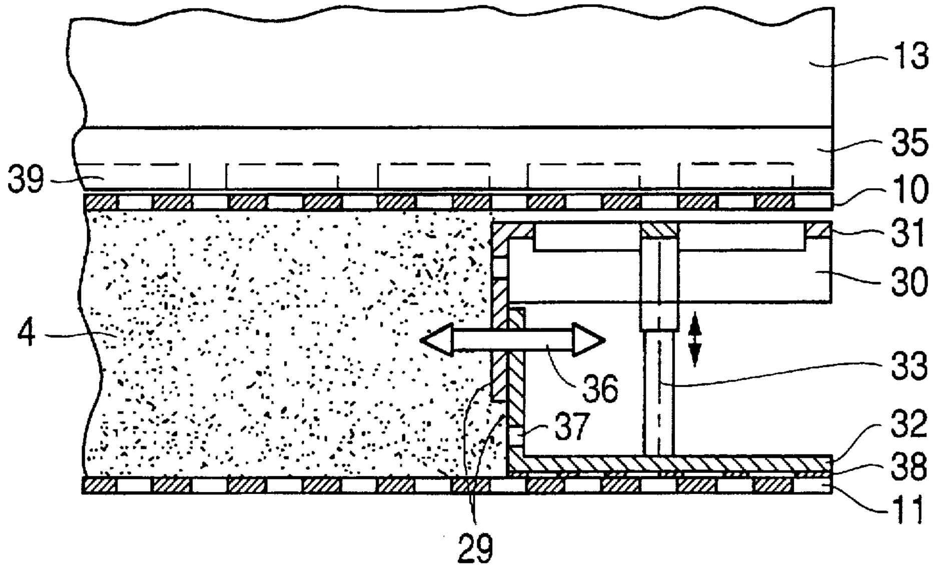
FIG. 3 shows a section a—a from FIG. 2.

Over the pressing face side, above and below, the pressed material mat 4 is restrained in the preliminary press with preheating and moisture conditioning device 2 between the gas-permeable, preferably meshed plastic belts, upper and lower screen belts 10 and 11. On both sides of the nozzle slits arranged in the boxes 13 transversely with respect to the transporting direction, the screen belts 10 and 11 are exactly guided above and below by fixed pressure rollers 12. For better and more gentle support of the screen belts 10 and 11 between the pressure rollers 12 and for better introduction of the hot air into the pressed material mat 4 and steam onto the pressed material mat 4, there are, as revealed by FIGS. 2 and 3, one or more knife-edge rolling strips 35 secured over the entire width of the pressed material mat 4 in the boxes 13. The rollers 39 mounted in the knife-edge rolling strips 35 thereby bring about virtually planar pressing faces between the pressing zones 34 of the pressure rollers 12.

Outside the telescopic panelings 29, acting as side border sealing means, the perforated screen belts 10 and 11 are restrained by an outwardly prolonged supporting roller construction 30 such that they are guided in parallel. The lateral telescopic paneling 29 comprises two angle plates 31 and 32, which are pressed slightly against the upper screen belt 10 and lower screen belt 11 by means of a resilient pressing system 33. To prevent undue stress on the screen belts 10 and 11, there are preferably likewise knife-edge rolling strips 30 provided in the horizontal parts of the angle plates 31 and 32, as a supporting roller construction. Opposite the pressing zone 34, strips 38 (coated with a TEFLON-brand non-stick coating) are fitted in the angle plates 31 and 32. For adaptation to various widths of pressed material mat, the two lateral telescopic panelings 29 can be horizontally adjusted by means of adjusting members, represented as a double-headed arrow 36. The adaptation to various thicknesses of pressed material takes place by vertical displacement of the angle plates 31 and 32 with respect to each other by means of a resilient pressing system 33.

The three knife-edge rolling strips 35 are secured in the side walls 42 and 43 of the boxes 13 by transverse struts. While the short knife-edge rolling strips 30 arranged in line therewith at the longitudinal borders restrain the screen belts 10 and 11, they are fixed in recesses of the angle plates 31 and 32. These securements may be performed by known processes, for example by welding. The boxes 13, serving as pressure and suction boxes for the feeding in and carrying away of the hot gases, are anchored in the upper and the lower press crossbeam (not shown). The boxes 13 have the same structural design both in the hot-air heating and drying device 8 and the steam wetting zone III.

Between the individual transversal pressure and suction boxes 13 with the lateral rolling restraint of the meshed belts 10 and 11 there are located along the zone in the region of the larger pressure rollers 12 of the continuously operating precompaction press 5 capillary sealing means, which are formed by anti-friction plastic coverings, for example adhesively attached TEFLON strips 38.

The degree of compaction or relief in the zones is adjusted according to the respective chip-dependent and/or fiber-dependent degree of flowing through by the hot gases in the hot-air heating and drying zone II. For this purpose, the hot-air heating and drying device 8 comprises a plurality of chambers. By this process, the moisture f is reduced to, for example, 9 percent by weight. In the hot-air heating and drying zone II, hot air at a temperature level t between 80° Celsius and 95° Celsius is fed to the pressed material mat 4 in closed hot-air circulation, the fed-in hot air being controlled in terms of moisture such that the initial moisture of the pressed material mat 4 at the end of the hot-air heating and drying zone II up to before entry into the continuously operating main press 3 lies below the customary controlled moisture.

The adjustable temperature level t at the end of the drying zone II is in direct relationship with the glue binder, to be precise depending on the kick-off temperature and the reaction time of the glue binder. The apparent density profile is adjusted in a specifically set manner after the continuously operating preliminary press with preheating and moisture conditioning device 2 in the continuously operating main press 3 by a corresponding programming of the pressing-displacement and/or pressing-force profile. A pressed material mat 4 with raised temperature level t and moisture content f is highly plastic, so that a specifically set compaction in the outer layer region is not possible and there ensues merely an apparent density profile with the disadvantages already mentioned.

To be able to adjust an optimum apparent density profile in the following main press 3, the temperature level t of the pressed material mat 4 raised by the preheating must be brought down by drying to a lower moisture f of the glue binder. This moisture may be approximately between 6 and 12 percent by weight of moisture, preferably 9 percent by weight. Generally, in the integrated operation of the hot-air drying process sequence, the moisture f of the pressed material mat 4 is controlled such that the entry moisture on entry into the continuously operating main press 3 is below the customary controlled moisture.

The hot air is alternately fed in by means of transversal longitudinal nozzle systems, boxes 13, as compressed air (arrow 17) between the pressure rollers 12 and then removed again by subatmospheric pressure suction from the pressed material mat 4, compacted to about 70% of the initial pressed material mat height (arrow 16), so that as a result a good flowing through of the pressed material mat 4 is produced, with at the same time an automatic cleaning effect of the perforation bores of the upper and lower meshed belts 10 and 11.

In the postcompaction press 9, the pressed material mat 4 is compacted to about 85% of the initial maximum scattered height and, consequently, preconditioned by the preceding devices in the process parameters of density s, temperature t and moisture f, is fed via the transfer lug 20 to the removal point 21 of the continuously operating main press 3. Each process section is separately adjusted mechanically by means of external adjusting members (not shown) in level of compaction, compression angle or depression angle.

On account of the shortened chemical reaction times of the glue binder, the complete preliminary press with preheating and moisture-conditioning device 2 is to be arranged as close as possible in front of the continuously operating main press 3. The continuously operating preliminary press with preheating and moisture-conditioning device 2 is further equipped with the following functions. It is reversible counter to the transporting direction from the forward position in front of the continuously operating main press 3 to a servicing position. The reversing travel 40 counter to the transporting direction is, for example, about 3 meters, so that in the moved-clear position, for example in starting-up operation or in the event of a fault, the pressed material mat 4 can be disposed of in a discharge bunker 28, without the mat having to pass through the continuously operating main press 3. At the same time, this moved-clear position can be used for servicing purposes, both for the continuously operating preliminary press with preheating and moisture-conditioning device 2 and for the continuously operating main press 3, in the run-in region.

The installation is also based on a modular construction of the continuously operating preliminary press with preheating and moisture-conditioning device 2 for different board thicknesses and board widths. Since the continuously operating main press 3 can be used for great differences in board thickness between 2.5 millimeters and, for example 40 millimeters, but a preheating of the pressed material mat 4 is of benefit with regard to a significant minimization of the pressing factor (pressing time in seconds per millimeter of board thickness) from a board thickness of about 16 millimeters, it is expedient with the costs of operating materials in mind, such as supplying energy for steam and hot-air generation, to switch off these integrated systems in the case of thin board production, for example less than 16 millimeters, and to use the continuously operating preliminary press with preheating and moisture-conditioning device 2 merely as a precompaction means for the pressed material mat 4, that is to say for deaeration.

Additional advantages and modifications will readily occur to those skilled in the art. Therefore, the invention in its broader aspects is not limited to the specific details, and representative devices, shown and described herein. Accordingly, various modifications may be made without departing from the spirit of scope of the general inventive concept as defined by the appended claims and their equivalents.

What is claimed is:

1. An installation for carrying out a process for the continuous production of boards of wood-based material, comprising:

a scattering station, arranged above a steam-permeable scattering belt, for forming a pressed material mat;

a heatable, continuously operating main press downstream of the scattering station; and a preliminary press with a preheating and moisture-conditioning device, the preliminary press is arranged between the scattering station and the main press, and is enclosed in a continuous mode of operation by respectively an upper and a lower steam-permeable screen belt, thereby forming a closed system, the closed system having a plurality of process sections including a precompaction press and a hot-air heating and drying device.

2. The installation as claimed in claim 1, wherein the process sections further comprise:

a steam wetting device for the pressing faces of the pressed material mat; and a postcompaction press.

3. The installation as claimed in claim 1, wherein the process sections enclosing the pressed material mat are supported by driving drums, deflecting drums and also stationary pressure rollers arranged therebetween and covering a width of a pressing region.

4. The installation as claimed in claim 1, wherein the precompaction press comprises stationary pressure rollers supporting the upper and the lower screen belts from above and below.

5. The installation as claimed in claim 4, wherein the pressure rollers of the postcompaction press are additionally supported above and below with respect to the pressed material mat by pressing belts.

6. The installation as claimed in claim 3, wherein boxes with portions widening in a trumpet shape toward the pressed material mat are arranged in the hot-air heating and drying device and the steam wetting device above and/or below, between the pressure rollers.

7. The installation as claimed in claim 6, wherein at least one knife-edge rolling strips are arranged between side walls of the boxes as support for the upper and the lower screen belts.

8. The installation as claimed in claim 2, wherein the plurality of process sections includes four process sections, each of the four process sections can be separately adjusted mechanically by external adjusting members in level of compaction and compression angle or decompression angle appropriately for neighboring process sections.

9. The installation as claimed in claim 1 wherein, when running through the preliminary press, the pressed material mat is bounded at the lateral longitudinal borders by a telescopic plate sealing member with inlet and outlet openings for feeding in or carrying away gas.

10. The installation as claimed in claim 9, wherein the upper and the lower screen belts are supported at two longitudinal side borders by small knife-edge rolling strips opposite and in line with the one or more knife-edge rolling strips arranged above and below over the entire width of the pressed material mat, said small rolling strips being secured in a horizontal part of the telescopic sealing member.

11. The installation as claimed in claim 1, wherein the preliminary press is arranged reversibly with respect to the continuously operating main press.

12. The installation as claimed in claim 1, further comprising a transfer lug located between the preliminary press and the continuously operating main press wherein a distance of the transfer lug from a lower steel belt of the continuously operating main press is made small enough so that a troublefree and undamaging transfer of the pressed material mat is made possible.

* * * * *